(12) United States Patent
Correia

(10) Patent No.: US 11,977,671 B2
(45) Date of Patent: *May 7, 2024

(54) AUGMENTED AUDIO CONDITIONING SYSTEM

(71) Applicant: Moea Technologies, Inc., Dover, DE (US)

(72) Inventor: John Correia, Spokane, WA (US)

(73) Assignee: Moea Technologies, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,678

(22) Filed: Jan. 20, 2023

(65) Prior Publication Data

US 2023/0152882 A1    May 18, 2023

Related U.S. Application Data

(63) Continuation of application No. 16/858,567, filed on Apr. 24, 2020, now Pat. No. 11,561,610.

(Continued)

(51) Int. Cl.
*H04R 5/02*     (2006.01)
*A63B 69/00*    (2006.01)
(Continued)

(52) U.S. Cl.
CPC .......... *G06F 3/011* (2013.01); *A63B 69/0071* (2013.01); *H04R 5/02* (2013.01); *H04S 7/303* (2013.01)

(58) Field of Classification Search
CPC ....... G06F 3/011; A63B 69/0071; H04R 5/02; H04S 7/303
(Continued)

(56) References Cited

U.S. PATENT DOCUMENTS

| 7,753,375 B1 | 7/2010 | Neal et al. |
| 8,721,476 B2 | 5/2014 | Mayers |

(Continued)

FOREIGN PATENT DOCUMENTS

WO    WO2017221239    12/2017

OTHER PUBLICATIONS

Baille, et al., "An Audtio-based Sports Video Segmentation and Event Detection Algorithm", IEEE, 2004, 10 pgs.

(Continued)

*Primary Examiner* — William A Jerez Lora
(74) *Attorney, Agent, or Firm* — Lee & Hayes P.C.; Bea L. Koempel-Thomas

(57) ABSTRACT

Techniques for implementing an augmented audio conditioning (AAC) system are described herein. In some examples, the AAC system can store conditioning data comprising crowd noise experiences associated with context-relevant environments and/or actions associated with an activity. The AAC system can detect an action of a user who is training in a conditioning environment and determine that the action is associated with the activity. In some examples, the AAC system can also determine an association between the action of the user and audio data representing a crowd noise experience of a context-relevant environment during an event. Furthermore, the AAC system can, in response to detecting the action of the user, output the audio-conditioning data into the conditioning environment to simulate the crowd noise experience of the context-relevant environment during the event.

20 Claims, 8 Drawing Sheets

Related U.S. Application Data

(60) Provisional application No. 62/988,368, filed on Mar. 11, 2020.

(51) Int. Cl.
*G06F 3/01* (2006.01)
*H04S 7/00* (2006.01)

(58) Field of Classification Search
USPC ............ 381/56, 58, 105, 119, 124; 473/422
See application file for complete search history.

(56) References Cited

U.S. PATENT DOCUMENTS

| | | | |
|---|---|---|---|
| 9,242,177 B2 | 1/2016 | Bistis et al. | |
| 9,583,144 B2 | 2/2017 | Ricciardi | |
| 9,619,891 B2 | 4/2017 | Bose et al. | |
| 9,749,708 B2 | 8/2017 | Blong et al. | |
| 9,782,660 B2 | 10/2017 | Tawiah | |
| 10,086,231 B2 | 10/2018 | Hall | |
| 10,219,094 B2 * | 2/2019 | Donaldson | H04S 7/303 |
| 10,306,303 B2 * | 5/2019 | Bhageria | H04N 21/4532 |
| 10,343,015 B2 | 7/2019 | Marty et al. | |
| 11,561,610 B2 * | 1/2023 | Correia | G06F 3/011 |
| 2005/0075198 A1 | 4/2005 | Rhyne, Jr. et al. | |
| 2012/0208660 A1 | 8/2012 | Mayers | |
| 2013/0106588 A1 | 5/2013 | Cho et al. | |
| 2016/0253917 A1 | 9/2016 | Tinjust | |
| 2017/0368413 A1 | 12/2017 | Shavit | |
| 2018/0137364 A1 * | 5/2018 | Forouhar | G06V 20/44 |
| 2019/0134487 A1 * | 5/2019 | Kudirka | A63F 13/211 |
| 2021/0286423 A1 | 9/2021 | Correia | |

OTHER PUBLICATIONS

Dechant, Zach, "Competitive Team Speed Training", printed from the internet on Oct. 31, 2019 from <<https://www.zachdechant.com/team-competitive-speed-training/>>, 4 pgs.

Ghuntla, et al., "A comparison and importance of auditory and visual reaction time in basketball players", printed from the internet on Oct. 31, 2019 from <<4.) http://www.sjosm.org/article.asp?issn=1319-6308;year=2014;volume=14;issue=1;spage=35;epage=38;aulast=Ghuntla>>, 5 pgs.

Gordon, Aaron, "Mental Training for Athletes", printed from the internet on Oct. 31, 2019 from <<https://getlucid.com/>>, 4 pgs.

Kruse Elite, "Neuro Training for Athletes", printed from the internet on Oct. 31, 2019 from <<https://www.kruseelite.com/neuro-training-for-athletes>>, 9 pgs.

"Neuroplasticity, How to Learn Faster, Halo Neuroscience", printed from the internet on Oct. 31, 2019 from <<https://www.haloneuro.com/pages/science>>, 10 pgs.

Office Action for U.S. Appl. No. 16/858,567, dated May 16, 2022, Correia, "Augmented Audio Conditioning System", 11 pgs.

Papic, et al., "The effect of auditory stimulus training on swimming start reaction time", printed from the internet on Oct. 31, 2019 from <<https://www.researchgate.net/publication/322440076_The_effect_of_auditory_stimulus_training_on_swimming_start_reaction_time>>, 14 pgs.

Andrews, Peregrine, The Sound of Sport: What is Real?, Feb. 2020, pp. 1-5.

Schaffert, et al., "A review on the relationship between sound and movement in sports and rehabilitation", printed from the internet on Oct. 31, 2019 from <<7.) https://www.frontiersin.org/articles/10.3389/fpsyg.2019.00244/full>>, 72 pgs.

Strickland, Eliza, "Olympic Athletes are Electrifying Their Brains, and you Can Too", printed from the internet on Oct. 31, 2019 from <<5.) https://spectrum.ieee.org/biomedical/bionics/olympic-athletes-are-electrifying-their-brains-and-you-can-too>>, 9 pgs.

Weir, Kirsten, "The athletic brain", printed from the internet on Oct. 31, 2019 from <<6.) https://www.apa.org/monitor/2019/03/athletic-brain>>, 5 pgs.

\* cited by examiner

AUGMENTED AUDIO CONDITIONING SYSTEM

This Application is a Continuation of U.S. application Ser. No. 16/858,567, filed Apr. 24, 2020, now patented as U.S. Pat. No. 11,561,610 on Jan. 24, 2023, which claims priority to U.S. Application No. 62/988,368, filed Mar. 11, 2020, all of which is incorporated herein by reference.

BACKGROUND

Performance is an important component of many activities, but improving performance remains a challenge for many Most existing training resources focus on providing physical and simulated visual objects that aid users to improve the way they train, and thus improve their performance potential. These existing resources allow a user to repetitively perform activities in relation to physical and/or simulated visual tools to build strong muscle memory and/or conditioned reactions to certain situations. As a result, when the user is put in a similar situation during a competitive performance, they can draw upon previous trainings to succeed.

Often times, however, the training resources are either expensive and/or only available through a specific trainer. Moreover, even some of the most sophisticated training resources cannot fully replicate the entire experience of a high-pressure environment. Existing solutions for those seeking to improve their performance do so through one-on-one coaching and obtaining time at limited facilities that are costly. Additionally, existing solutions require large amounts of time on the part of a user and coach for limited exposure. As such, these existing solutions do not adequately create dynamic environments with dynamic feedback, and further do not create an experience that recreates a high energy, high pressure performance environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures are depicted not to scale with each other.

DETAILED DESCRIPTION

Figure 1:
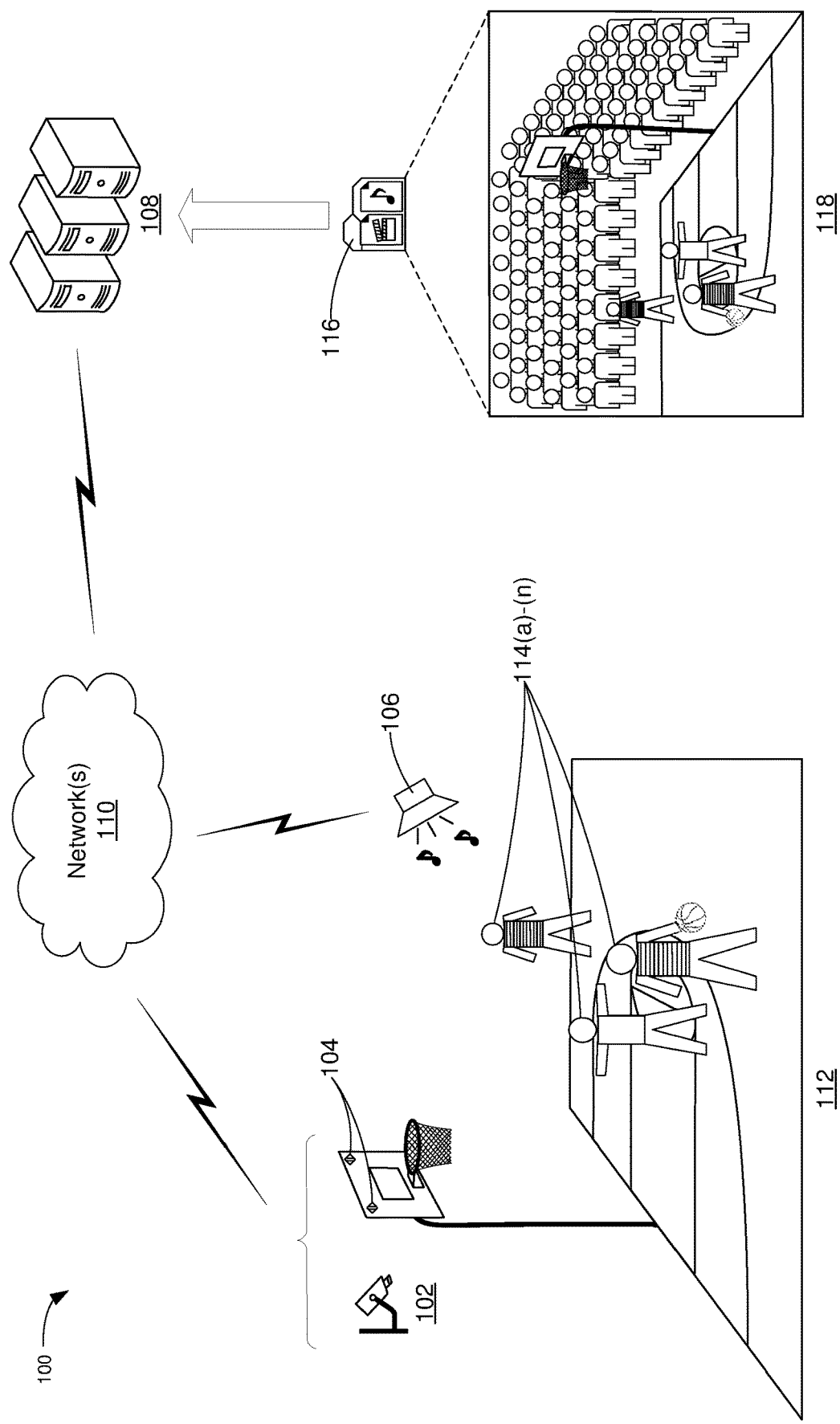
FIG. 1 illustrates an example environment/architecture of an augmented audio conditioning system.

This disclosure is directed to an augmented audio conditioning (AAC) system that is designed to enhance training and performance by providing an augmented audio experience for any strenuous, high-pressure activity for which a person can prepare and experience via practice, conditioning, and performance. The AAC creates dynamic environments with dynamic feedback that recreates a performance environment such as a high-energy, high-pressure performance environment via an augmented audio experience, which enhances the training experience and conditions the user to perform in a desired performance environment and/or conditions the user as if they are performing in a desired performance environment. The AAC system is designed to provide a dynamic interactive audio environment that recreates the audio experience of a desired performance environment.

As used herein, the phrase "performance environment" means a context-relevant environment that "users" are attempting to condition themselves to and/or with, such as a sports venue during a game (e.g., Gonzaga University's McCarthey Athletic Center, Safeco Field, Century Link Field, the Arena at Seattle Center, a particular track, Augusta National Golf Course, etc.), an entertainment venue during a concert (e.g., The Tacoma Dome, Carnegie Hall, the Kennedy Center, La Scala, etc.), a performance venue during taping of a live performance, (e.g., a sound stage, a theater, a university auditorium, the Gaillard Center, etc.), a convention center during an event (e.g., a TED Talk, a motivational speaker, a rally, a cultural event, etc.), a number of roads and/or freeways during a traffic event (e.g., rush hour, a traffic accident, a natural disaster, etc.), or another context-relevant environment. In some instances, a venue could be a virtual environment that a user wants to condition themselves to and/or with, such as a particular video game (e.g., NBA 2k19, Madden NFL20, FIFA 20, etc.). In some instances, a venue can correspond to several types of performance environments, such as the Arena at Seattle Center, the Tacoma Dome, etc. hosting athletic events, concerts, comedy performances, cultural events, etc. In some examples the context-relevant environment can include specific spectator(s) (e.g., parent, friend, celebrity, self).

As used herein, a context-relevant environment can include more general crowd noise experiences, such as a crowd roar from an event not tied to a particular venue, e.g., a soccer event, a football event, a hockey event, a basketball event, a volleyball event, a golf event, an acting event, a speech event, a rally event, or another desired audio environment. In some examples the context-relevant environment can include even more general crowd noise experiences such as a crowd roar from an event not tied to a particular venue and/or activity, e.g., an indoor-athletic event, an outdoor-athletic event, a musical event, a performance event, a cultural event, NBA game, NCAA game, etc.

As used herein, a desired performance environment includes the actions and associated audio environment in which the users seek to train or perform in. This environment can be brought into the system via a video and/or audio data file. The video file can be used to provide examples of actions and audio experiences used by the system to reproduce the audio environment for the user while training or performing. The audio file can be used to create a wide range of sounds and changes in sounds used by the system to reproduce the audio environment while the user is training or performing.

As used herein, the phrase "conditioning environment" means an environment where users train to condition themselves to, or performs in, the audio experiences associated with a performance environment. The conditioning environment can include a gym, a field, a sports venue, etc. Any training or performance activities that a user uses to improve their capabilities can take place in a conditioning environment.

As used herein, the term "user" is a general term covering a plurality of types of users. For example, one type of user can be a person or persons who are training or performing in the conditioning environment of the AAC system. In at least one example, the user can include a single user. In another example, the user can include multiple users and/or a team or teams of one or more users. In some examples, a first user can be associated with a first team and a second user can be associated with a second team that is in opposition to the first team in the conditioning environment. In at least one example, a user can include an athlete associated with an athletic activity (e.g., basketball, football, hockey, baseball, softball, tennis, automobile racing, gymnastics, golf, track & field, etc.) who is using the AAC system to condition themself to audio experiences associated with a performance environment. In some examples, the athlete may be a single athlete and/or a team of one or more athletes. In at least one example, a user can be a second type of user, which can include a coach and/or a trainer. The coach and/or trainer can, in some examples, be a head coach, offensive coach, defensive coach, athletic trainer, personal trainer, etc. In some examples, a user can be a third type of user, which can include administrators or operators of a venue, officials of an organization, organizers of a tournament or other competition. In various examples, a user can be a fourth type of user, which can include a performer. For instance, a user that is a performer can include a musician, comedian, dancer, actor, motivational speaker, church pastor, debater, politician, talk-show host, chef, etc. In some examples, a user can be a fifth type of user, which can include a casual user. For instance, a user that is a casual user can include a student driver, a test taker, a chess player, a video gamer, etc.

In at least one example, an AAC system as described herein can be implemented in a game environment. Such an implementation can be beneficial to various users regarding an event for which spectator attendance has been strictly limited or disallowed. In at least this scenario, users can be athletes competing in a game, competitors in a competition, participants in an event, administrators or operators of a venue, officials of an organization, organizers of a tournament or other competition, and/or broadcasters of the game and/or competition for which spectator attendance has been strictly limited or disallowed. For example, a user-official can obtain a copy of software to implement AAC, install the software on a computing resource at a competition venue or accessible to a competition venue (e.g., in the cloud), where the computing resource can be operatively connected via a network to one or more cameras, microphones, and/or other sensors and to one or more speakers. The AAC system as described herein can then be operated to recreate crowd noise that is missing due to the low number of or lack of spectators, which provides a conditioning environment akin to the competition and/or performance environment for which the competitors have trained. Specific examples of such implementations can include basketball games, soccer matches, other athletic events, political debates, live concerts, other performances, etc.

In various examples, the AAC system includes an environment learning module. The environment learning module can process video and/or audio files to identify an association between physical actions of a sporting event/activity and audio experiences of the performance environment in which the sporting event/activity takes place. For instance, in one example the environment learning module can process video and/or audio files of a live men's basketball game played at the McCarthey Athletic Center. By processing these data files, the environment learning module can determine crowd noises associated with the McCarthey Athletic Center during a men's basketball game corresponding to various aspects of the basketball game, such as when the home team makes a basket, the home team misses a shot, the visiting team makes a basket, the visiting team has possession of the ball, etc. Additionally, or alternatively, the environment learning module can process the video and/or audio files to determine variations in the audio environment corresponding to one or more of different teams, different players, how many people are in attendance, etc.

In some examples, the AAC system includes one or more sensors disposed in a conditioning environment where the users train or performs. The one or more sensors can capture data corresponding to various actions of the users who train or perform in the conditioning environment. In various examples, the one or more sensors include a camera that captures images of users in the conditioning environment, and the AAC system can store and/or communicate images and corresponding image data. As used herein, the term "image data" refers to photographic images, video data, video imagery, etc. Additionally, or alternatively, the one or more sensors can include microphones that capture audio of the users in the conditioning environment and/or binary input sensors that senses binary inputs associated with the conditioning environment. One example of a binary input in this context is a basketball shot being made and/or missed. The AAC system can store and/or communicate audio and/or binary input and corresponding audio data.

In various examples, the AAC system includes an action detection module. The action detection module can receive sensor data from one or more sensors and/or cameras disposed in the conditioning environment. Based at least in part on this sensor data, the action detection module can determine that a user has engaged in an action associated with an athletic activity. In some examples, an action can include one or more "situational aspects" associated with the athletic activity. As used herein, a "situational aspect" associated with an athletic activity can include, for example, a user possessing the ball while playing some form of basketball, a user being on offense, a user being on defense, a user serving a penalty, etc. For instance, the action detection module can determine that a user has made (or missed) a basket while playing basketball, and/or that a user is engaged in one or more situational aspects associated with playing basketball, such as possessing the ball on offense. In some instances, the action detection module can determine that the shot was taken from the free-throw line, within the three-point line, outside the three-point line, etc. and/or other aspects of the game. In some examples, the action detection module can determine that the user has engaged in the action based at least in part on receiving a binary input of sensor data indicating that a basketball passed through a basketball hoop.

In some examples, the action detection module can use machine learning and/or image processing techniques to determine that the user engaged in the action. In various examples, the action detection module can use machine learning and/or image processing to determine that the user is engaged in the particular athletic activity. For instance, machine learning and/or image processing can determine that the user is playing basketball, football, hockey, soccer, baseball, etc., based on image detection algorithms identifying that the image is associated with a particular sport and/or a particular activity within the sport. In some examples, the AAC system includes an audio experience generator module. The audio experience generator module can receive an indication of a selected performance environment and optional situational factors in which a user wishes to condition themself. Situational factors can include, for example, a 3-point basketball shot, a shot at the end of a basketball game (e.g., "buzzer-beater"), a drive at the end of a football game (e.g., "two-minute drill"), a championship game, etc. The audio experience generator module can communicate with the environment learning module and/or the action detection module. The audio experience generator module can receive inputs from the action detection module indicating that the user has engaged in the action associated with the athletic activity. In response to receiving the input, the audio experience generator module can query the environment learning module for audio conditioning data corresponding to the action and a desired performance environment selected by the user. As an example, the audio experience generator module can receive an indication that a user wishes to condition herself to audio experiences associated with McCarthey Athletic Center. In this way, when the audio experience generator receives an input from the input detection module that the user made (or missed) a basket while, shooting baskets alone or with another, and/or playing some form of basketball, the audio experience generator module can query the environment learning module for audio conditioning data corresponding to a made (or missed) shot during a basketball game at McCarthey Athletic Center. Additionally, the audio experience generator can be developed to integrate psychological theories (e.g., Operant Conditioning Theory) and tactics to improve training and performance in the selected environment and situations.

In various examples, the audio experience generator module sends audio conditioning data to an audio environment transmitter module. The audio environment transmitter module can be in communication with one or more audio devices associated with the AAC system. For instance, the audio environment transmitter module can be in communication with an audio device via a wireless communication channel, such as Bluetooth, Wi-Fi, cellular, etc. Additionally, or alternatively, the audio environment transmitter module can be in communication with the audio device via a wired communication channel In some examples, audio devices associated with the AAC system can include headphones, speakers, and/or stadium/arena loudspeakers at a venue. In some examples, the audio device that is in communication with the audio environment transmitter module can output audio conditioning data while the user(s) trains or performs in the conditioning environment.

In some examples, the AAC system includes a user interface module. The user interface module can present visual reports and/or selections to users and receive user system selections when the AAC system is in use. System selections are related to which desired environment the user would like to condition in, which actions the user desires to have trigger changes in the audio environment, and which situational aspects the user desires the audio experience to recreate. For instance, the user can select to have the AAC system output audio conditioning data corresponding to a basketball game in McCarthey Athletic Center, to have specific audio data output corresponding to when the user makes (or misses) a basket, and/or to have audio data output corresponding to the last few seconds of a tied playoff game.

In some examples, the AAC system includes an archiving and/or reporting tool module. The archiving and/or reporting tool can monitor activities in the system and, in some instances and/or with authorization, can cause recordings of the activities to be stored in a memory associated with the system. In some examples, stored data can be used to develop static and/or dynamic feedback and/or reporting for further analysis.

In various examples, the modules of the AAC system described herein, such as an environment learning module, an action detector module, an audio experience generator module, an audio environment transmitter module, an archiving and/or reporting tool module, and a user interface module, can exist as hardware components, as software, or a combination thereof. Additionally, a module can include its own processor(s), memory, operating system(s), input/output interface(s), network interface(s), etc. Additionally, or alternatively, a module can share processor(s), memory, operating system(s), input/output interface(s), network interface(s), etc. with other modules. In some examples, the AAC system can be scaled such that the AAC system can be available for users to use on personal electronic devices, such as a smartphone and/or tablet, stationary computing devices, such as a desktop computer, for example, and/or distributed computing systems, such as one or more server computers. In some examples, the AAC system can include several different hardware resources such that the system can be deployed in larger training or performance facilities and/or conditioning environments, such as an arena/stadium.

Specific examples are described herein in order to meet statutory requirements. However, the description itself is not intended to limit the scope of the claims of this patent. Rather, the inventor has contemplated that the claimed invention might also be implemented in other ways, to include different elements or combinations of elements similar or equivalent to what is described in this document, in conjunction with other present or future technologies.

The present disclosure provides an overall understanding of the principles of the structure, function, manufacture, and use of the devices and methods described herein. One or more examples of the present disclosure are illustrated in the accompanying drawings. Those of ordinary skill in the art will understand that the devices and methods specifically described herein and illustrated in the accompanying drawings are non-limiting. The features illustrated or described in connection with one example can be combined with the features of other examples, including as between devices and methods. Such modifications and variations are intended to be included within the scope of the appended claims.

Additional details are described below with reference to the accompanying figures.

FIG. 1 illustrates an example environment/architecture 100 of an AAC system. As shown, the environment/architecture 100 includes an image sensor 102, a binary input sensor(s) 104, a speaker 106, and computing resource(s) 108. The network(s) 110 can facilitate communications between the computing resource(s) 108, the image sensor 102, the binary input sensor(s) 104, and/or the speaker 106. Further, the image sensor 102, binary input sensor(s) 104, and speaker 106 can be disposed in a conditioning environment 112 (which in some cases can be a game environment or a performance environment absent many or most spectators) in which one or more users 114(a)-(n) (where n represents any number greater than or equal to one) can train, play, and/or perform.

In various examples, the image sensor 102 can include a camera that is capable of recording videos and/or still images. In some examples, the image sensor 102 can include a plurality of image sensors to collect image data of the users 114(a)-(n) training or performing in the conditioning, game, and/or performance environment 112. A plurality of image data can be captured at the same time and from different angles such that the AAC system can detect multiple actions of the one or more users 114(a)-(n). As a result, the AAC system can generate different audio conditioning data outputs for the multiple actions of the users. In some examples, the image sensor 102 can capture and/or send image data over the network(s) 110 to the computing resource(s) 108. In at least one example, the image data may include a video and/or a photographic image.

In some examples, the binary input sensor(s) 104 can capture binary input data associated with specific events. For instance, binary input sensor(s) can capture data that indicates whether a basketball shot was made (or missed), whether a goal was scored, whether a user is in a specific area of the conditioning, game, and/or performance environment, etc. As such, the binary input sensor(s) 104 can include a proximity sensor, a pressure sensor, a motion sensor, an occupancy sensor, a microphone, etc. In some examples, the binary input sensor(s) 104 can capture and/or send sensor data over the network(s) 110 to the computing resource(s) 108.

In various examples, the speaker 106 can output audio data, such as audio conditioning data, into the conditioning, game, and/or performance environment 112. The speaker 106 can be in communication with the computing resource(s) 108 via the network(s) 110. The speaker 106 can include a network of speakers that are strategically disposed in the conditioning, game, and/or performance environment 112 such that the audio conditioning data appears more realistic to the one or more users 114(a)-(n).

In various examples, the computing resource(s) 108 can include processors, memory, operating systems, input/output interfaces, network interfaces, and other hardware components, or any combination thereof. In some examples, the computing resource(s) 108 can perform various machine-learning and/or image processing techniques. In some examples, the modules of the AAC system described herein, such as an environment learning module, an action detector module, an audio experience generator module, an audio environment transmitter module, an archiving and/or reporting tool module, and a user interface module, can be instantiated on the computing resource(s) 108. Additionally, or alternatively, environment learning data 116, which includes audio and/or video files corresponding to desired performance environments, such as performance environment 118, can be uploaded and/or pushed to the computing resource(s) 108. As such, the environment learning module of the computing resource(s) 108 can determine audio conditioning data associated with actions of an athletic activity during sporting events.

In some examples, the network(s) 110 can facilitate communications between the computing resource(s) 108 and the image sensor 102, the binary input sensor(s) 104, the speaker 106, and other input and/or output devices associated with the conditioning, game, and/or performance environment 112. The network(s) 110 can include a network of wired and/or wireless connections. The network(s) 110 can include a Personal Area Network (PAN), Local Area Network (LAN), Wireless Local Area Network (WLAN), Campus Area Network (CAN), Metropolitan Area Network (MAN), Wide Area Network (WAN), System-Area Network (SAN), cellular network, etc. In some examples, data can flow from device to device over the network(s) 110 bi-directionally. In other examples, the data can flow uni-directionally from device to device.

In various examples, the environment learning data 116 can include audio and/or video data files corresponding to desired performance environments 118. For instance, the environment learning data can include video data with corresponding audio data of a basketball game played at McCarthey Athletic Center, a football game played at Century Link Field, a baseball game played at Safeco Field, or another activity. In some examples, the audio data can correspond to crowd noises of spectators at athletic events. For instance, the crowd noise can include applause, booing, cheering, and/or general crowd noise.

Figure 2:
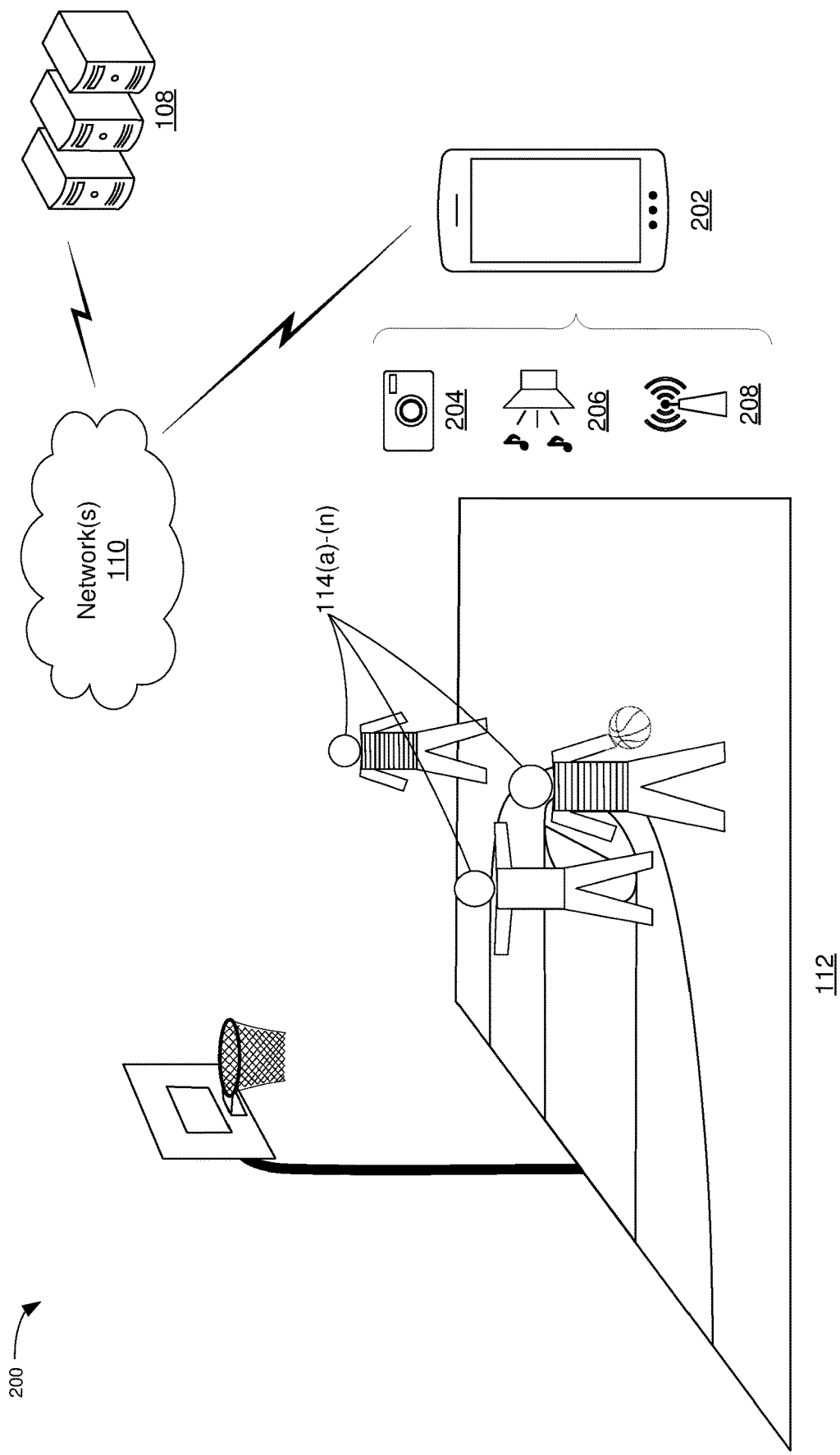
FIG. 2 illustrates an example environment/architecture of an augmented audio conditioning system.

FIG. 2 illustrates an example environment/architecture 200 of an AAC system. As shown, a user electronic device 202 communicates over the network(s) 110 with the computing resource(s) 108 to facilitate the AAC system. The user electronic device 202 can include a camera 204, speakers 206, and one or more wireless communication interface(s) 208.

In some examples, the user electronic device 202 can execute an application associated with the AAC system to give one or more users 114(a)-(n) an augmented audio conditioning experience. For instance, the user electronic device 202 can include a processor, and the application can store computer-readable media that causes the user electronic device 202 to capture, with the camera 204, image data associated with the one or more users 114(a)-(n) in the conditioning, game, and/or performance environment 112. In some examples, based on the captured image data, the application running on the user electronic device 202 can determine an action of the one or more users 114(a)-(n) that is associated with an athletic activity. The application can then cause the user electronic device 202 to send, over the network(s) 110, an input corresponding with the action to the computing resource(s) 108. In response to receiving the input from the user electronic device 202, the computing resource(s) 108 can identify audio conditioning data associated with the action and cause the user electronic device 202 to output the audio conditioning data via the speakers 206 into the conditioning, game, and/or performance environment 112 such that the one or more users 114(a)-(n) experience the audio conditioning.

In various examples, the user electronic device 202 can include a smartphone, a tablet, a laptop computer, a voice-enabled device, a smart camera, or another personal electronic device. In some examples, a user electronic device 202 may comprise one or more user electronic devices. The user electronic device can include one or more user interface components and/or input/output components, such as a touchscreen. In some examples, the user electronic device 202 can operate in an offline mode to provide the augmented audio conditioning experience. The user electronic device 202 can store the modules of the AAC system described herein in local memory, such as an environment learning module, an action detector module, an audio experience generator module, an audio environment transmitter module, an archiving and/or reporting tool module, and a user interface module. Additionally, or alternatively, the user electronic device 202 can store audio conditioning data files in a local memory.

In some examples, the camera 204 of the user electronic device 202 can capture images and/or video associated with the one or more users 114(a)-(n) in the conditioning, game, and/or performance environment 112. In some examples, the camera 204 can serve as an image sensor for the AAC system. In some examples, the speakers 206 of the user electronic device 202 can output audio conditioning data into the conditioning, game, and/or performance environment 112.

In some examples, the user electronic device 202 can include an integrated camera and/or speaker, such as camera 204 and speaker 206. However, in some examples the camera 204 and/or speaker 206 can be stand-alone hardware devices that are communicatively coupled to the user electronic device 202 via a wired and/or wireless connection. For instance, the user electronic device 202 can utilize a wireless communication interface 208 to facilitate communication between camera 204 and/or speakers 206. As such, in some examples, the speaker 206 can include headphones or earphones worn by the one or more users 114(a)-(n) who desire to train or perform with the audio conditioning experience. In some examples, the user electronic device 202 can include one or more microphones to provide audio data inputs to the AAC system.

In some examples, the one or more wireless communication interface(s) 208 of the user electronic device 202 can enable the user electronic device 202 to communicate with the computing resource(s) 108 over the network(s) 110. Additionally, or alternatively, the wireless communication interface(s) 208 can enable the user electronic device 202 to communicate with peripheral devices, such as camera 204 and/or speaker 206. For instance, the user electronic device 202 can utilize the wireless communication interface(s) 208 to establish a Bluetooth communication channel with at least one of the camera 204 and/or the speaker 206.

Figure 3:
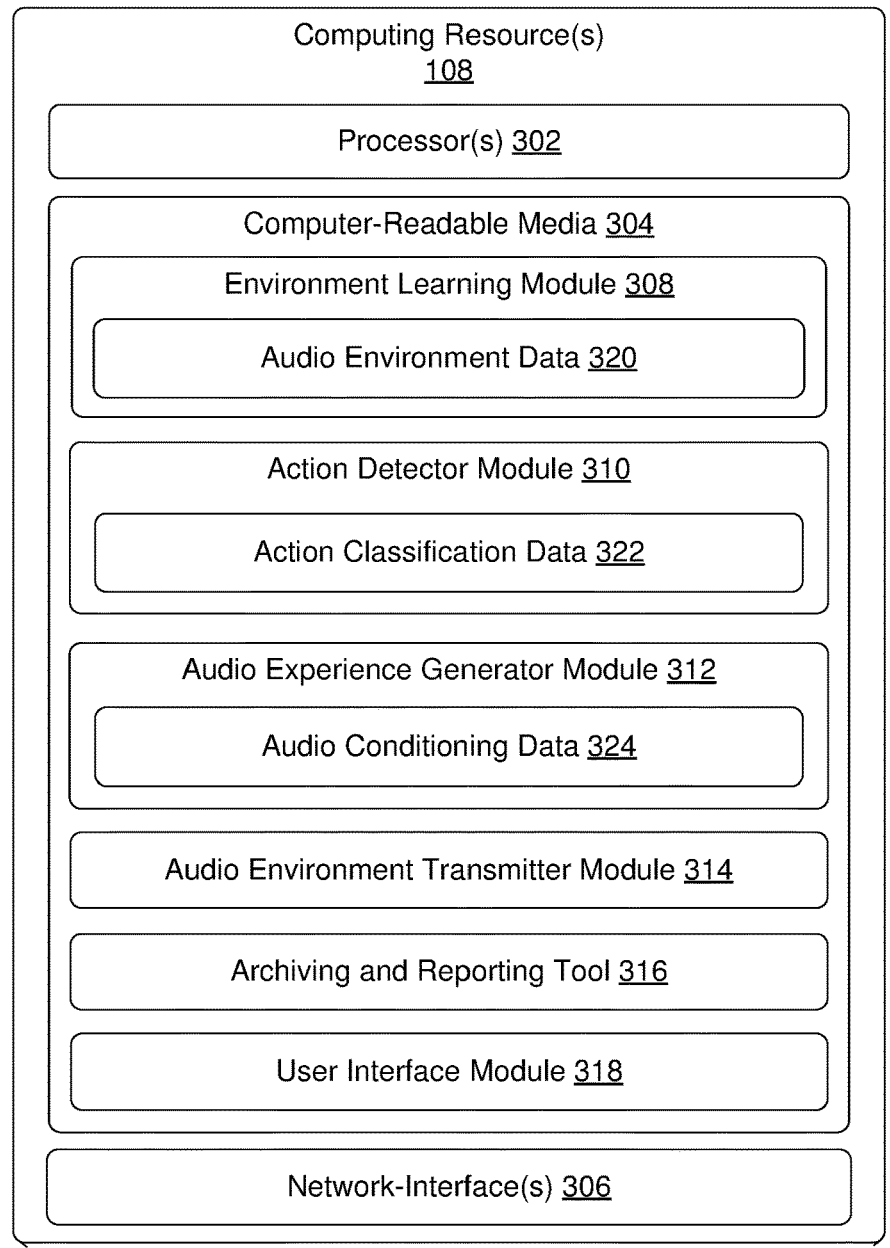
FIG. 3 is a block diagram illustrating example detail of a computing resource of an augmented audio conditioning system.

FIG. 3 is a block diagram illustrating example detail 300 of a computing resource 108 of an AAC system. As shown, the computing resource 108 can include processor(s) 302, memory 304, and one or more network-interface(s) 306.

In some examples, the processor(s) 302 can process data and power the various hardware, software, and firmware components of the computing resource(s) 108. As used herein, a processor, such as processor(s) 302 and/or 402 (shown in FIG. 4), can include multiple processors and/or a processor having multiple cores. Further, the processors can include one or more cores of different types. For example, the processors can include application processor units, graphic processing units, and so forth. In one implementation, the processor can include a microcontroller and/or a microprocessor. The processor(s) 302 and/or 402 can include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Each of the processor(s) 302 and/or 402 can possess its own local memory, which also can store program components, program data, and/or one or more operating systems.

In some examples, the computer-readable media 304 can store the various modules of the AAC system, such as an environment learning module 308, action detector module 310, audio experience generator module 312, audio environment transmitter module 314, archiving and/or reporting tool 316, and a user interface 318. As described herein, computer-readable media 304 and/or 404 (shown in FIG. 4) can include volatile and nonvolatile memory, removable and non-removable media implemented in any method or technology for storage of information, such as computer-readable instructions, data structures, program component, or other data. Such computer-readable media 304 and/or 404 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media can be implemented as computer-readable storage media ("CRSM"), which can be any available physical media accessible by the processor(s) 302 and/or 402 to execute instructions stored on the computer-readable media 304 and/or 404. In one basic implementation, CRSM can include random access memory ("RAM") and Flash memory. In other implementations, CRSM can include, but is not limited to, read-only memory ("ROM"), electrically erasable programmable read-only memory ("EEPROM"), or any other tangible medium which can be used to store the desired information, and which can be accessed by the processor(s).

Further, functional components can be stored in the respective memories, or the same functionality can alternatively be implemented in hardware, firmware, application specific integrated circuits, field programmable gate arrays, or as a system on a chip (SoC). In addition, while not illustrated, each respective memory, such as computer-readable media 304 and/or 404, discussed herein can include at least one operating system (OS) component that is configured to manage hardware resource devices such as the network interface(s), the I/O devices of the respective apparatuses, and so forth, and provide various services to applications or components executing on the processors. Such OS component can implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

In some examples, the computing resource(s) 108 can utilize one or more network interface(s) 306 to communicate over wired and/or wireless networks. For instance, the network interface(s) 306 can include wired or wireless interfaces, such as a wireless or Wi-Fi network communications interface, an Ethernet communications interface, a cellular network communications interface, a Bluetooth communications interface, etc., for communications with the image sensor 102, binary input sensor(s) 104, speaker 106, or user electronic device 202 over various types of networks 110, including wide-area network, local-area networks, private networks, public networks etc. In the case of a wireless communications interfaces, such interfaces can include radio transceivers and associated control circuits and logic for implementing appropriate communication protocols. The network interface(s) 306 can include logic for communicating using any different type of network communication protocol.

The environment learning module 308 can store and/or receive audio environment data 320. The environment learning module 308 can use the audio environment data 320 to determine audio experiences associated with various performance environments. Additionally, or alternatively, the environment learning module 308 can use the audio environment data 320 to determine associations between actions of a sporting event and changes in an audio environment of a sporting venue in which the sporting event is held. In some examples, the environment learning module 308 can perform machine learning and/or image processing techniques on the audio environment data 320 to determine the above described associations. For instance, the environment learning module 308 can be trained, such as by a neural network, a deep neural network, etc. to determine audio experiences associated with scoring a basket in basketball by pushing audio and/or video files to the environment learning module 308 of users scoring baskets in a performance environment during a live game.

The action detector module 310 of the computing resource(s) 108 can store action classification data 322. The action classification data 322 can include associations between actions of users and athletic activities. The action classification data 322 can include machine learning inputs and/or outputs such as from support vector machines, machine vision, data mining, etc. to classify actions of users.

The audio experience generator module 312 can store audio conditioning data 324. The audio conditioning data 324 can be associated with one or more inputs corresponding to actions of users. For instance, the audio conditioning data 324 can be associated with the action classification data 322. In some examples, a specific audio conditioning file can be selected and/or identified based on a specific action classification.

The audio environment transmitter module 314 can send audio conditioning data over the network(s) 110 to the speakers 106 and/or 206 for outputting the audio conditioning data into the conditioning environment. The audio environment transmitter module 314 can utilize the network-interface(s) 306 of the computing resource(s) 108 to send the audio conditioning data.

The archiving and/or reporting tool 316 of the computing resource(s) 108 can monitor for particular and/or all the activities in the AAC system and record them to storage. This stored data can then be used to develop static and/or dynamic reporting for further analysis.

The user interface module 318 can be designed to present visual reports to the users and receive user system selections. System selections are related to which desired environment the user would like to condition in, which actions the user desires to have trigger changes in the audio environment, and which situational aspects the user desires the audio experience to recreate. For instance, the user can select to have the AAC system output audio conditioning data corresponding to a basketball game in McCarthey Athletic Center, to have specific audio data output corresponding to when the user makes a basket, and/or to have specific audio data output corresponding to a conference and/or playoff game. The user interface module 318 can present visual reports to the user and/or receive the user system selections via one or more interface devices, such as a smartphone, LCD screen, tablet, laptop computer, desktop computer, smart television, etc.

Figure 4:
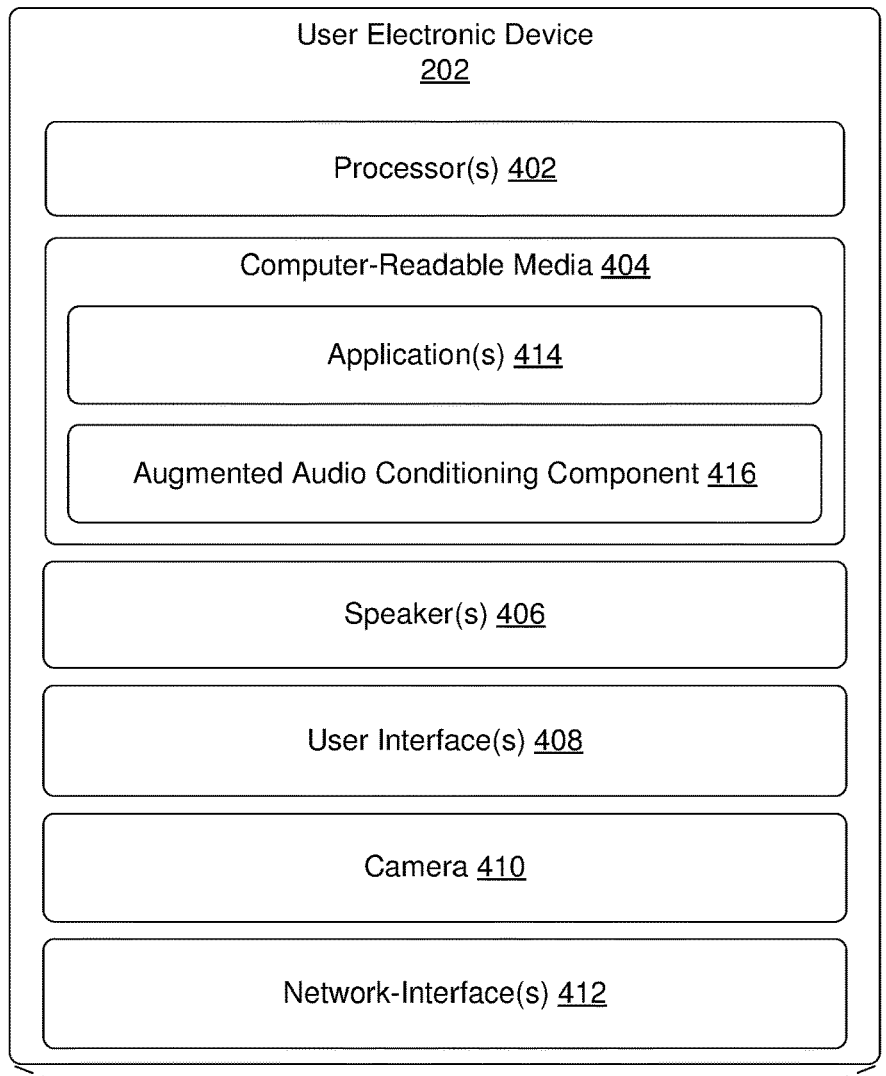
FIG. 4 is a block diagram illustrating example detail of a user electronic device of an augmented audio conditioning system.

FIG. 4 is a block diagram illustrating example detail 400 of a user electronic device 202 capable of performing the techniques of an AAC system. As shown, the user electronic device 202 can include processor(s) 402, memory 404, speaker(s) 406, user interface(s) 408, a camera 410, a network-interface controller 412.

In some examples, the processor(s) 402 can process data and power the various hardware, software, and firmware components of the user electronic device 202. The computer-readable media 404 can store one or more application(s) 414 and an Augmented Audio Conditioning (AAC) component 416. Although depicted in FIG. 4 as separate components, in some examples, an application of the one or more applications 414 can include the AAC component 416 and/or an AAC application such that the user electronic device 202 can perform the functionality of the AAC system. In some examples, the AAC component 416 and/or an AAC application may include some or all of the various modules of the AAC system described herein, such as the environment learning module, action detector module, audio experience generator module, audio environment transmitter module, archiving and/or reporting tool module, and user interface module.

The user electronic device 202 can include one or more speaker(s) 406. The speakers 406 can be used to output audio conditioning data into a conditioning environment. The speakers 406 can be integral to the user electronic device 202 or peripheral. In the case of a peripheral speaker, the user electronic device 202 can communicate with the peripheral speaker via the network-interface(s) 412.

The user electronic device 202 can include one or more user interface(s) 408. The user interface(s) 408 can receive inputs from users of the user electronic device 202 or display information to the user. The user interface(s) 408 can include a display of the user electronic device, such as a liquid crystal display (LCD), or a touchscreen display. Additionally, or alternatively, the user interface(s) 408 can include a microphone to receive voice inputs from a user in the form of a spoken command and/or can include touch inputs such as buttons and/or icons displayed on a touchscreen display. The user interface(s) 408 can be integrated or peripheral.

The user electronic device 202 can also include a camera 410. In some examples, the camera 410 can be integrated into the user electronic device or can be peripheral and in communication with the user electronic device 202 via a network connection. In some examples, the camera 410 can serve as an image sensor for the AAC system. In the case of a peripheral camera, the camera can communicate with the user electronic device 202 via the network interface 412.

The user electronic device 202 can include one or more network-interface(s) 412. In some examples, each of the network interface(s) 306 and/or network interface(s) 412 can include a personal area network (PAN) component to enable communications over one or more short-range wireless communication channels. For instance, the PAN component can enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 306 and/or network interface(s) 412 can include a wide area network (WAN) component to enable communication over a wide area network. The network(s) 110 can represent an array of wired networks, wireless networks, such as Wi-Fi, or combinations thereof.

Figure 5:
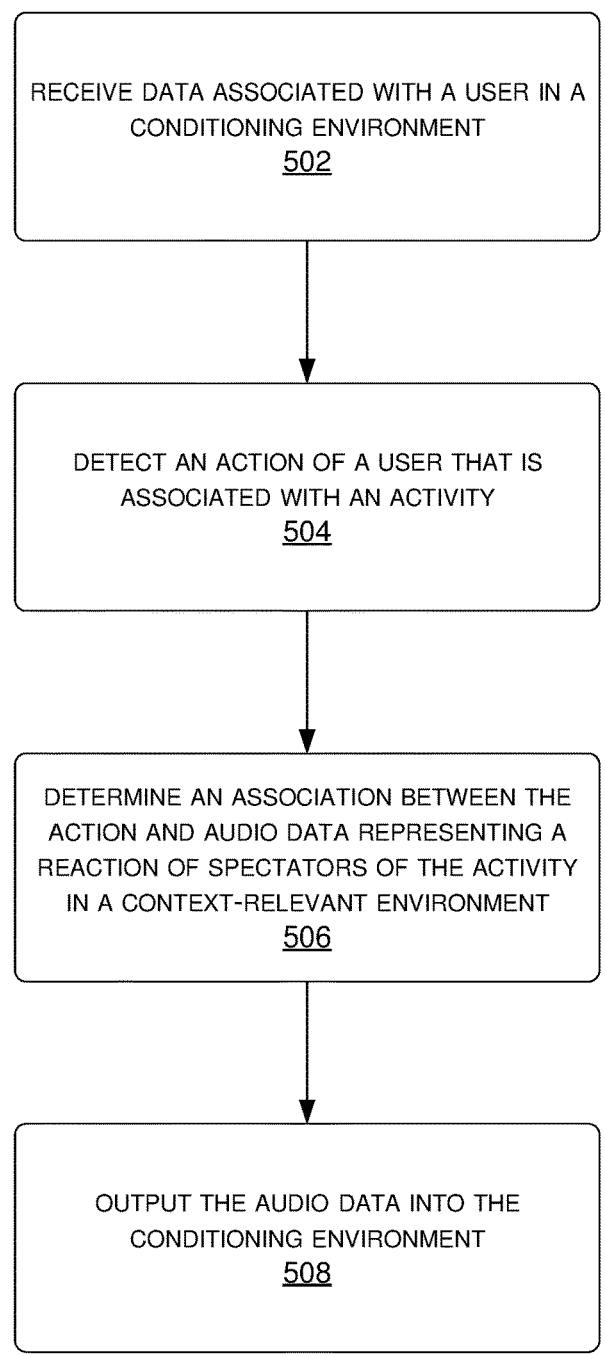
FIG. 5 illustrates an example process of an augmented audio conditioning system.
Figure 6:
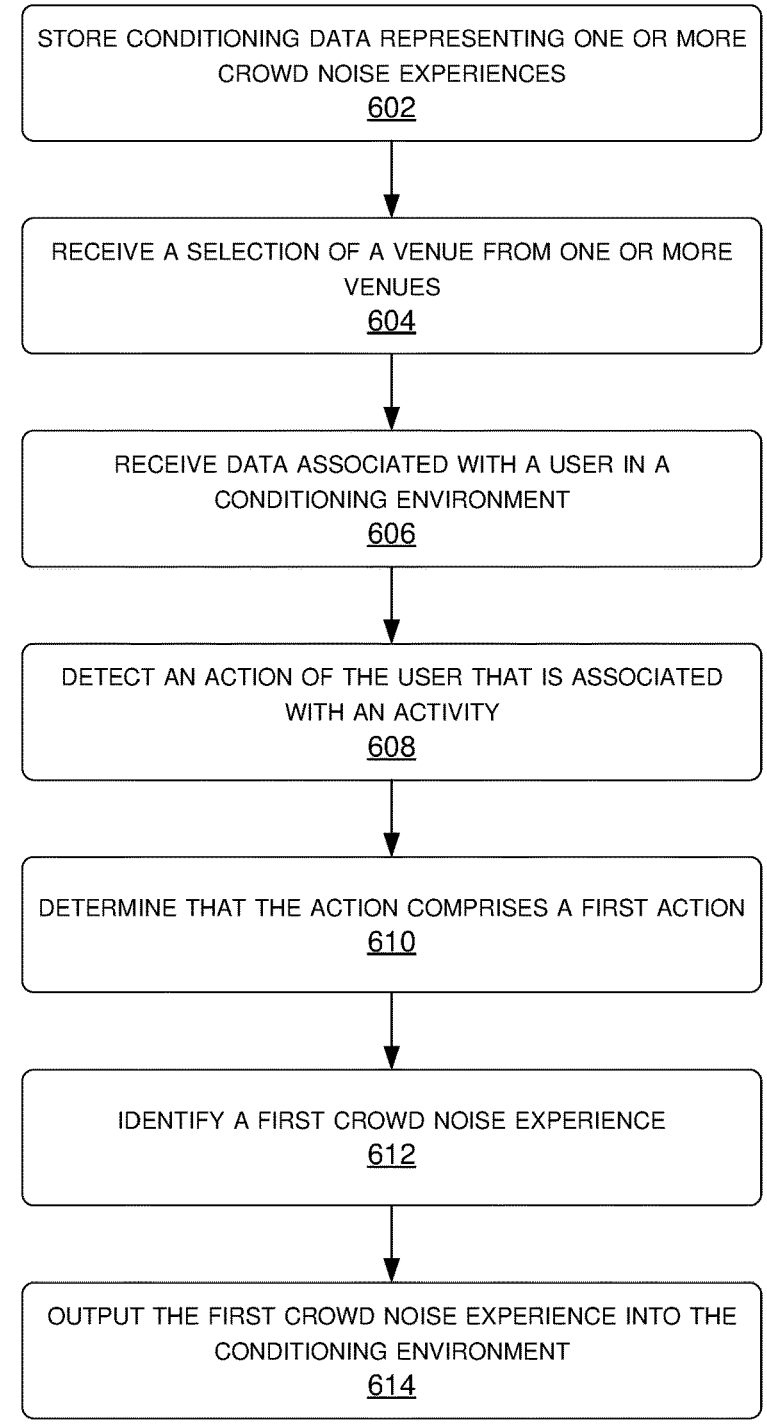
FIG. 6 illustrates another example process of an augmented audio conditioning system.

FIGS. 5, 6, and, collectively, 7A and 7B, illustrate various example processes of an augmented audio conditioning system. The processes 500, 600, and 700 are illustrated as logical flow graphs, each operation of which represents a sequence of operations that can be implemented by the system. The processes 500, 600, and 700 may, in some examples, be implemented in whole or in part by any one of the computing resource(s) 108, the user electronic device 202, and/or the processor(s) 302 and/or 402. The order in which the operations are described is not intended to be construed as a limitation, and any number of the described operations can be combined in any order and/or in parallel to implement the process. Further, any number of the described operations can be omitted.

FIG. 5 illustrates an example process 500 of an augmented audio conditioning system. At block 502, the process 500 includes receiving data associated with a user in a conditioning environment. In some examples, the data can be captured by an image sensor, a camera, a microphone, or another input device. In some examples, the data can include image data of the user and/or audio data of the user. In other examples, the data can include binary inputs from a sensor in the conditioning environment. For instance, in a basketball setting, a sensor can detect when baskets are made (or missed) by the user and capture corresponding data.

At block 504, the process 500 includes detecting an action of a user that is associated with an activity. For instance, the action associated with the activity can include making a basket during basketball practice, possession of the ball while on offense, scoring a goal during hockey or soccer practice, scoring a touchdown during football practice, etc. Additionally, or alternatively, the action can include a dance move, telling a joke, singing a song, and the like. In some examples, detecting the action can be based at least in part on the image data and/or sensor data described above with respect to block 502. Additionally, or alternatively, detecting the action can be based at least in part on stored conditioning data. For instance, a machine learning model can be generated using the conditioning data, and machine learning and/or image processing can be performed on the image data to determine the specific actions of the user.

At block 506, the process 500 includes determining an association between the action and audio data representing a reaction of one or more spectators of the activity in a context-relevant environment. In some examples, determining the association can be based at least in part on and/or in response to detecting the action of the user. In some examples, determining the association can further include identifying conditioning data so that the audio data can be output to the conditioning environment. In some examples, the audio data representing the reaction of the one or more spectators of the activity can be associated with a similar action to the action of the user. As an example, the system can store audio data corresponding to a made (or missed) basketball shot in McCarthey Athletic Center during a basketball game. Accordingly, if the user in the conditioning environment makes a basketball shot, the system can determine an association between the made (or missed) shot in the conditioning environment and the audio data corresponding to the made (or missed) shot in the McCarthey Athletic Center during a basketball game.

At block 508, the process 500 includes outputting the audio data into the conditioning environment. In some examples, the audio data can be output in real-time in response to the action of the user such that the conditioning environment reproduces the reaction of the one or more spectators of the activity in the context-relevant environment. Continuing the example from above in block 506, the audio data corresponding to the made (or missed) shot in the McCarthey Athletic Center during a basketball game can be output into the conditioning environment such that the conditioning environment simulates the audio experience of making a shot during a live game at the McCarthey Athletic Center, even though the user made (or missed) the shot in the conditioning environment. In some examples, outputting the audio data into the conditioning environment can include sending the audio data to one or more audio output devices (e.g., speakers, headphones worn by users, arena loudspeakers, phone speakers, etc.).

FIG. 6 illustrates another example process 600 of an augmented audio conditioning system. At block 602, the process 600 includes storing conditioning data representing one or more crowd noise experiences. The crowd noise experiences, for instance, can include general crowd noises, such as cheering, applauding, booing, chanting, singing, laughing, etc. In some examples, the one or more crowd noise experiences can be associated with one or more venues. For instance, crowd noise experiences can be associated with crowd noises from various stadium venues, such as the McCarthey Athletic Center, Safeco Field, Century Link Field, etc. Additionally, or alternatively, the one or more crowd noise experiences can be associated with one or more actions associated with the one or more activities. For example, a crowd noise experience can be associated with a made (or missed) basketball shot or a football touchdown during a competition. Further, a crowd noise experience can be associated with a made (or missed) basketball shot at the McCarthey Athletic Center, a touchdown at Century Link Field, or a homerun at Safeco Field.

At block 604, the process 600 includes receiving a selection of a venue from one or more venues and optional situational factors from one or more situational factors. In some examples, the venue can include one of the plurality of venues as described above with respect to block 702. For instance, the input can indicate a selection of the McCarthey Athletic Center, Cameron Indoor Stadium, etc. In some examples, the venue can be more generalized. For example, the venue can include basketball arena, baseball stadium, football field, golf course, opera house, concert hall, highway, video game, etc. In some examples, the selection of the venue may be input by the user via a user interface. In some examples, the optional situational factors may include a type of action (e.g., 3 point shot in basketball) or an action in a particular situation (e.g., a putt at the final hole of the Masters golf tournament to win). The user interface may be presented, in some examples, on a display of a mobile device of the user, such as user electronic device 202. Additionally, or alternatively, the user interface may be presented on a device associated with the AAC system, such as computing resource(s) 108.

At block 606, the process 600 includes receiving data associated with a user in a conditioning environment. In some examples, the data can be captured by an image sensor, a camera, a microphone, or another input device. In some examples, the data can include image data of the user and/or audio data of the user. In other examples, the data can include binary inputs from a sensor in the conditioning environment. For instance, in a basketball setting, a sensor can detect when baskets are made (or missed) by the user and capture corresponding data. In some examples, the data may be received via a network communication channel that facilitates communication between an input device and the AAC system.

At block 608, the process 600 includes detecting an action of the user that is associated with an activity. For instance, the action associated with the activity can include making a basket during basketball practice, possession of the ball while on offense, scoring a goal during hockey or soccer practice, scoring a touchdown during football practice, etc. In some examples, detecting the action can be based at least in part on the image data and/or sensor data described above with respect to block 606. Additionally, or alternatively, detecting the action can be based at least in part on the stored conditioning data described above at block 602. For instance, a machine learning model can be generated using the conditioning data, and machine learning and/or image processing can be performed on the image data to determine the specific actions of the user.

At block 610, the process 600 includes determining that the action comprises a first action. In some examples, the first action can correspond to first conditioning data and/or a first crowd noise experience. For instance, the action of the user can include a made shot during a basketball practice, scrimmage, etc., and the first action can include a made shot during a live basketball game. In some examples, machine learning and/or image processing may be used to determine that the action of the user comprises the first action.

At block 612, the process 600 includes identifying a first crowd noise experience. In some examples, the first crowd noise experience can be associated with a similar action to the action of the user. As an example, the system can store audio data corresponding to a made (or missed) basketball shot in McCarthey Athletic Center during a basketball game. Accordingly, if the user in the conditioning environment makes a basketball shot, the system can determine an association between the made (or missed) shot in the conditioning environment and the audio data corresponding to the made (or missed) shot in the McCarthey Athletic Center during a basketball game.

At block 614, the process 600 includes outputting the first crowd noise experience into the conditioning environment. In some examples, the first crowd noise experience can be output in real-time in response to the action of the user such that the conditioning environment reproduces the reaction of the spectators of the activity in the live-performance environment. Continuing the example from above, the first crowd noise experience corresponding to the made (or missed) shot in the McCarthey Athletic Center during a basketball game can be output into the conditioning environment such that the conditioning environment reproduces the audio experience of making a shot during a live game at the McCarthey Athletic Center, even though the user made (or missed) the shot in the conditioning environment. In some examples, outputting the audio data into the conditioning environment can include sending the audio data to one or more audio output devices (e.g., speakers, headphones worn by users, arena loudspeakers, phone speakers, etc.).

Figure 7A:
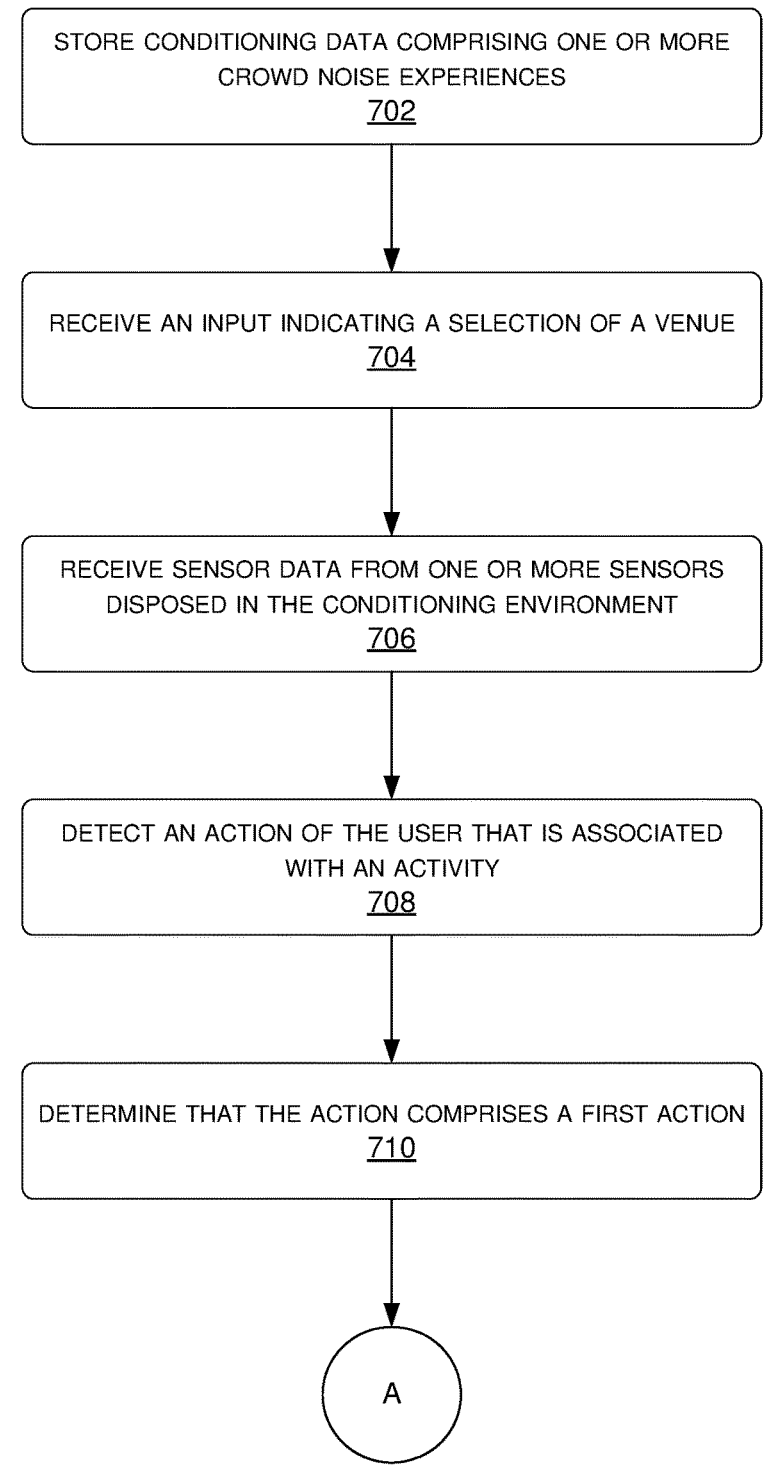
FIGS. 7A and 7B collectively illustrate yet another example process of an augmented audio conditioning system.
Figure 7B:
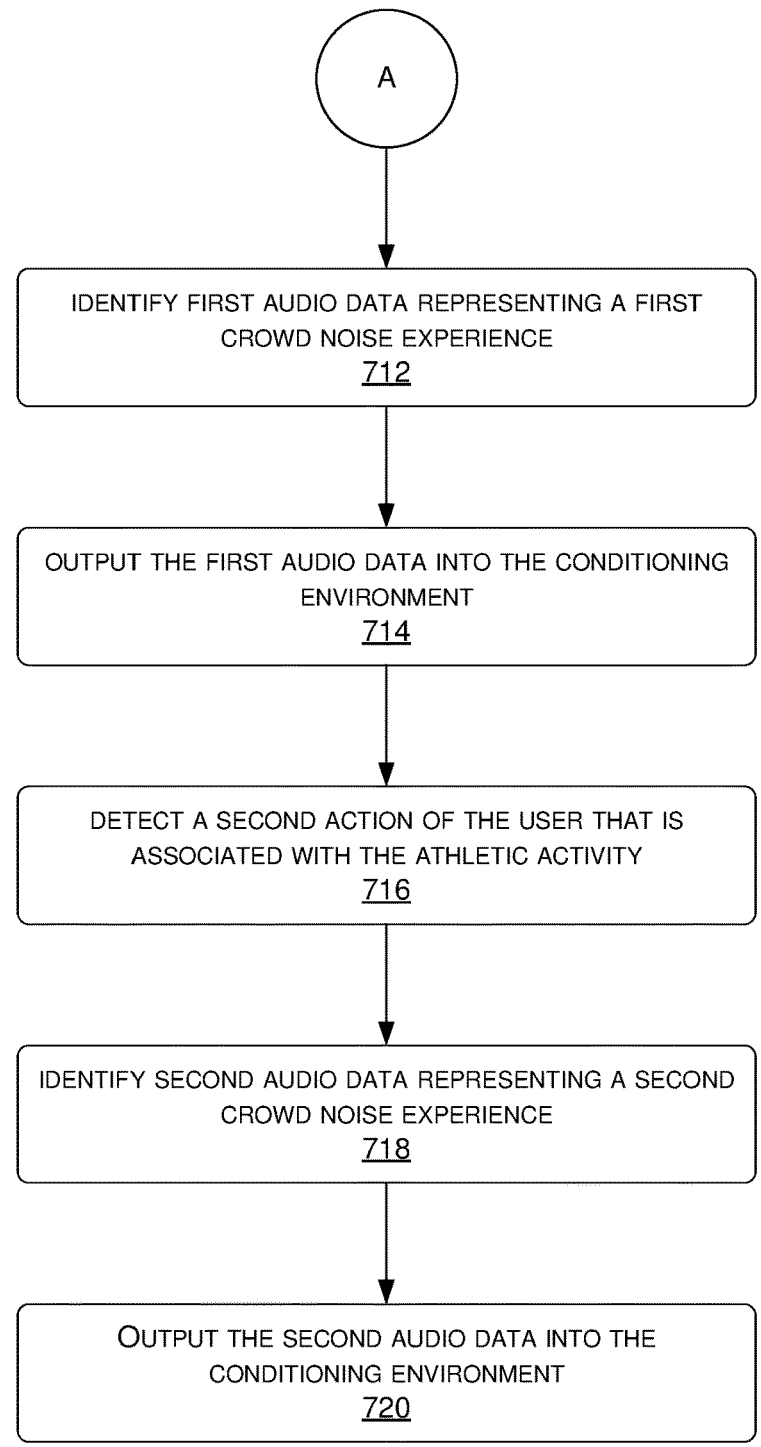

FIGS. 7A and 7B collectively illustrate yet another example process 700 of an augmented audio conditioning system. At block 702, the process 700 includes storing conditioning data comprising one or more crowd noise experiences. The crowd noise experiences, for instance, can include general crowd noises, such as cheering, applauding, booing, chanting, singing, laughing, etc. In some examples, the one or more crowd noise experiences can be associated with one or more venues. For instance, crowd noise experiences can be associated with crowd noises from various stadium venues, such as the McCarthey Athletic Center, Safeco Field, Century Link Field, etc. Additionally, or alternatively, the one or more crowd noise experiences can be associated with one or more actions associated with the one or more activities. For example, a crowd noise experience can be associated with a made (or missed) basketball shot or a football touchdown during a competition. Further, a crowd noise experience can be associated with a made (or missed) basketball shot at the McCarthey Athletic Center, a touchdown at Century Link Field, or a homerun at Safeco Field.

At block 704, the process 700 includes receiving an input indicating a selection of a venue and optional situational factors from one or more factors. In some examples, the venue can include one of the plurality of venues as described above with respect to block 702. For instance, the input can indicate a selection of the McCarthey Athletic Center or Century Link Field. In some examples, the venue can be more generalized. For example, the venue can include basketball arena, baseball stadium, football field, golf course, opera house, concert hall, highway, video game, etc. In some examples situational factors could be specific to the activity (basketball dunk) or situational factors (a basketball shot to silence an upbeat crowd).

At block 706, the process 700 includes receiving sensor data from one or more sensors disposed in the conditioning environment. The sensor data can include audio data, photographic images, and/or binary inputs. The sensor data can be received over a network connection. For instance, the sensor associated with capturing the data can be communicatively coupled via a network to one or more processors that receive the sensor data.

At block 708, the process 700 includes detecting an action of the user that is associated with an activity. For instance, the action associated with the activity can include making a basket during basketball practice, possession of the ball while on offense, scoring a goal during hockey or soccer practice, scoring a touchdown during football practice, etc. In some examples, detecting the action can be based at least in part on the sensor data described above with respect to block 706. Additionally, or alternatively, detecting the action can be based at least in part on the conditioning data described above with respect to block 702. For instance, a machine learning model can be generated using the conditioning data, and machine learning and/or image processing can be performed on the image data to determine the specific actions of the user.

At block 710, the process 700 includes determining that the action of the user comprises a first action. In some examples, the first action can correspond to first conditioning data and/or a first crowd noise experience. For instance, the action of the user can include a made shot during a basketball practice, scrimmage, etc., and the first action can include a made shot during a live basketball game. In some examples, machine learning and/or image processing may be used to determine that the action of the user comprises the first action.

At block 712, the process 700 includes identifying first audio data representing a first crowd noise experience. In some examples, the first audio data representing the first crowd noise experience can be associated with a similar action to the action of the user. As an example, the system can store audio data corresponding to a made (or missed) basketball shot in McCarthey Athletic Center during a basketball game. Accordingly, if the user in the conditioning environment makes a basketball shot, the system can determine an association between the made (or missed) shot in the conditioning environment and the audio data corresponding to the made (or missed) shot in the McCarthey Athletic Center during a basketball game.

At block 714, the process 700 includes outputting the first audio data into the conditioning environment. In some examples, the first audio data can be output in real-time in response to the action of the user such that the conditioning environment simulates the crowd noise experience of the athletic venue during the sporting event. Continuing the example from above in block 710, the audio data corresponding to the made (or missed) shot in the McCarthey Athletic Center during a basketball game can be output into the conditioning environment such that the conditioning environment simulates the audio experience of making a shot during a live game at the McCarthey Athletic Center, even though the user made (or missed) the shot in the conditioning environment.

At block 716, the process 700 includes detecting a second action of the user that is associated with the athletic activity. In some examples, the second action can be different than the first action. For instance, while the first action can include a made (or missed) basketball shot or a football touchdown, the second action can include a blocked basketball shot, an intercepted football pass, etc. In some examples, detecting the second action can be based at least in part on second image data and/or sensor data. In some cases, the second action can be similar to the first action but having a different situational component, e.g., second made shot in a row. In some cases, the second action can be the same as the first action, just subsequent to it (second made shot after a first made shot). In some cases, the second action can be a pre-determined amount of time passed which triggers the event of a second action. Additionally, or alternatively, detecting the action can be based at least in part on the conditioning data described above with respect to block 702. For instance, a machine learning model can be generated using the condition data, and machine learning and/or image processing can be performed on the image data to determine the specific actions of the user.

At block 718, the process 700 includes identifying second audio data corresponding to the same or a second crowd noise experience. In some examples, identifying the second audio may be due to a situational factor such as after a specific amount of time has passed. In some examples, identifying the second audio data can be based at least in part on and/or in response to detecting the second action of the user. Additionally, or alternatively, identifying the second audio data can further include determining an association between the second action of the user and the second audio data. In some examples, the second crowd noise experience of the athletic venue can be associated with a similar action to the second action of the user. As an example, the system can store audio data corresponding to a blocked basketball shot in the McCarthey Athletic Center during a basketball game. Accordingly, if the user in the conditioning environment blocks a basketball shot, the system can determine an association between the blocked shot in the conditioning environment and the audio data corresponding to the blocked shot in the McCarthey Athletic Center during the live basketball game. In some cases, the second crowd noise experience of the athletic venue can be similar or the same to the first crowd noise experience.

At block 720, the process 700 includes outputting the second audio data into the conditioning environment. In some examples, the second audio data can be output in real-time in response to the second action of the user such that the conditioning environment simulates the second crowd noise experience of the athletic venue during the sporting event. Continuing the example from above in block 716, the audio data corresponding to the blocked shot in the McCarthey Athletic Center during a basketball game can be output into the conditioning environment such that the conditioning environment simulates the audio experience of blocking a shot during a live game at the McCarthey Athletic Center, even though the user blocked the shot in the conditioning environment.

While the foregoing describes specific examples, it is to be understood that the scope of the claims is not limited to any of these specific examples. Since other modifications and changes varied to fit particular operating requirements and environments will be apparent to those skilled in the art, the claims should not be considered limited to the example chosen for purposes of disclosure, and cover all changes and modifications which do not constitute departures from the spirit and scope of this application.

Although the application describes specific structural features and/or methodological acts, it is to be understood that the claims are not necessarily limited to the specific features or acts described. Rather, the specific features and acts are merely illustrative of one or more examples that fall within the scope of the claims. Moreover, unless explicitly stated otherwise, any of the examples set forth herein are combinable.

What is claimed is:

1. A system comprising:
one or more processors; and
one or more computer-readable media storing instructions that, when executed, configure the one or more processors to:
store first data representing one or more noise experiences, wherein a first noise experience of the one or more noise experiences is associated with a first activity in a first venue;
receive, via a user interface, a selection of the first venue from one or more venues;
receive, via the user interface, a selection of a first situational factor from one or more situational factors;
identify the first data representing the first noise experience based at least in part on the selection of the first venue and based at least in part on the first situational factor;
detect, an action of a user in an environment, wherein the action is associated with the first activity;
transmit, responsive to the action of the user, the first data to a device in the environment configured to reproduce the first noise experience.

2. The system of claim 1, the one or more processors further configured to:
identify second data representing a second noise experience of the first venue that is different than the first noise experience; and
subsequent to transmitting the first data, transmit the second data to configure the device in the environment to reproduce the second noise experience.

3. The system of claim 1, wherein the action of the user comprises a first action, the one or more processors further configured to:
receive image data associated with the user in the environment;
detect, based at least in part on the image data, a second action of the user that is associated with the activity, the second action different from the first action; and
wherein identifying the second audio data is based at least in part on the second action.

4. The system of claim 1, wherein the one or more noise experiences include at least one noise experience associated with one or more spectators.

5. The system of claim 1, wherein at least one of:
the data comprises image data, the one or more processors further configured to capture the image data of the user in the environment;
the data comprises sensor data, the one or more processors further configured to capture sensor data with one or more sensors disposed in the environment; or the data comprises audio data, the one or more processors further configured to capture audio data with a microphone in the environment.

6. The system of claim 1, the one or more processors further configured to:
receive image data associated with the user in the environment;
determine that the action of the user comprises a first action; and
wherein identifying the audio data representing the first noise experience is further based at least in part of the action comprising the first action.

7. A method comprising:
receiving data associated with a user in a first environment;
detecting, based at least in part on the data, an action of the user that is associated with an activity;
identifying, based at least in part on detecting the action, audio data representing a first reaction of one or more spectators of the activity in response to witnessing a similar action to the action in a second environment;
outputting the audio data into the first environment in response to detecting the action of the user;
identifying second audio data representing a second reaction of the one or more spectators of the activity in the second environment; and
transmitting the second audio data into the first environment.

8. The method of claim 7, wherein at least one of: the first environment includes a conditioning environment or the second environment includes a performance environment.

9. The method of claim 7, further comprising receiving an input from the user indicating a selection of the second environment, and wherein transmitting the audio data comprises transmitting the audio data such that a device in the first environment is configured to reproduce the first or second reaction of the one or more spectators of the activity in the second environment.

10. The method of claim 7, further comprising at least one of:
capturing image data of the user in the first environment;
capturing sensor data associated with the first environment; or
capturing audio data associated with the user in the first environment.

11. The method of claim 7, wherein the action of the user comprises a first action, the method further comprises:
receiving a selection of a situational aspect from one or more situational aspects, the situational aspect representing an amount of time remaining of the activity in the second environment;
receiving second data associated with the user in the first environment;
detecting, based at least in part on the second data, a second action of the user that is associated with the activity, the second action different from the first action; and
wherein identifying the second audio data is based at least in part on at least one of the situational aspect or the second action, and wherein outputting the second audio data is at least partially responsive to detecting the second action.

12. The method of claim 7, wherein the first reaction of the spectators comprises a positive reaction and the second reaction of the spectators comprises a negative reaction.

13. The method of claim 7, wherein at least one of:
the data comprises image data, the method further comprising capturing, with a camera, the image data of the user in the first environment;
the data comprises sensor data, the method further comprising capturing sensor data with one or more sensors disposed in the first environment; or
the data comprises audio data, the method further comprising capturing, with a microphone, the audio data associated with the user in the first environment.

14. One or more computer-readable storage media storing instructions that, when executed, configure one or more processors to perform a method as claim 7 recites.

15. A system comprising:
one or more processors; and
one or more computer-readable media storing instructions that, when executed, configure the one or more processors to:
receive data associated with a user in a conditioning environment;
detect an action of the user that is associated with an activity;
determine an association between the action and first audio data representing a reaction of spectators of the activity in a context-relevant environment in response to witnessing a similar action to the action in the context-relevant environment;
transmit the first audio data to a device in the conditioning environment configured to reproduce, in response to the action of the user, the first audio data representing the reaction of the spectators of the activity;
identify second audio data associated with a second reaction of the spectators of the activity in the context-relevant environment; and
transmit the second audio data to a device in the conditioning environment.

16. The system of claim 15, the one or more processors further configured to:
receive an input from the user indicating a selection of the context-relevant environment; and
transmit the audio data to the device in the conditioning environment, to configure the device in the conditioning environment to reproduce the reaction of the spectators of the activity in the context-relevant environment.

17. The system of claim 15, wherein at least one of:
the data comprises image data, the one or more processors further configured to capture the image data of the user in the conditioning environment;
the data comprises sensor data, the one or more processors further configured to capture sensor data with one or more sensors disposed in the conditioning environment; or
the data comprises audio data, the one or more processors further configured to capture audio data with a microphone in the conditioning environment.

18. The system of claim 15, wherein the action comprises a first action, the one or more processors further configured to:
receive second data associated with the user in the conditioning environment;
detect, based at least in part on the second data, a second action of the user that is associated with the activity, the second action different from the first action; and
wherein identifying the second audio data is based at least in part on the second action and wherein outputting the second audio data is at least partially responsive to detecting the second action.

19. The system of claim 15, wherein the context-relevant environment includes at least one of: a sports venue, an entertainment venue, a performance venue, a convention center, a traffic environment, or a virtual environment.

20. The system of claim 15, the one or more processors further configured to store the first audio data representing the reaction of spectators of the activity in the context-relevant environment in response to witnessing the similar action to the action.

* * * * *